United States Patent [19]

Ehrenfels

[11] Patent Number: 5,239,129
[45] Date of Patent: Aug. 24, 1993

[54] HOUSING FOR SWITCHED ELECTRICAL RECEPTACLE OR THE LIKE

[75] Inventor: Alfred L. Ehrenfels, Cheshire, Conn.

[73] Assignee: Hubbell Incorporated, Orange, Conn.

[21] Appl. No.: 864,393

[22] Filed: Apr. 6, 1992

[51] Int. Cl.[5] .......................... H02G 3/08; H05K 5/02
[52] U.S. Cl. ..................................... 174/51; 174/50; 220/3.3; 361/641
[58] Field of Search .................. 174/51, 65 R, 50; 22/3.2, 3.3, 3.4; 361/334, 356

[56] References Cited

U.S. PATENT DOCUMENTS

| | | | |
|---|---|---|---|
| 4,260,863 | 4/1981 | Appleton | 200/144 |
| 4,265,365 | 5/1981 | Boteler | 220/3.3 |
| 4,620,061 | 10/1986 | Appleton | 174/51 |
| 4,973,797 | 11/1990 | Jorgensen et al. | 174/53 |
| 4,994,631 | 2/1991 | Williams, Jr. | 174/67 |

OTHER PUBLICATIONS

Hubbell Brochure titled "NEMA 1 Surface Mounting Enclosures" published Mar. 18, 1985 (one page).

*Primary Examiner*—Harold Broome
*Attorney, Agent, or Firm*—Jerry M. Presson; Walter C. Farley

[57] ABSTRACT

An electrical housing apparatus has an electrically non-conductive enclosure with side and end walls. One of the end walls has an opening to receive an electrical conduit and the other walls are un-perforated. An electrically conductive frame is mounted inside the enclosure, the frame being arranged to support electrical devices is a specific vertical orientation and provide ground bonding between the conduits and electrical devices in the housing. Mounting brackets at opposite ends of the frame have openings either of which can be aligned with the end wall opening when the frame is placed in the enclosure, depending on the orientation of the enclosure: the end wall with the opening can be at the top to accommodate a top conduit connection or at the bottom to accommodate a bottom conduit connection. A water-resistant cover closes the front of the box, the cover and frame being arranged to have a single orientation regardless of which enclosure orientation is used.

16 Claims, 7 Drawing Sheets

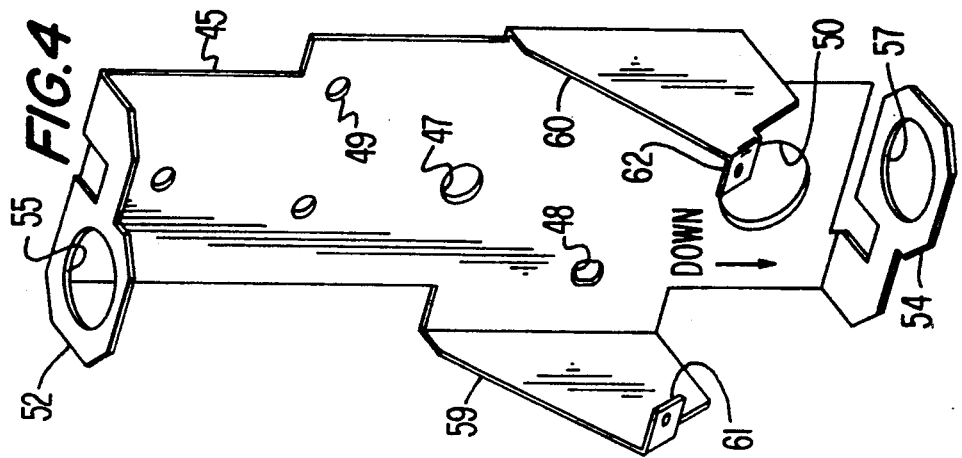
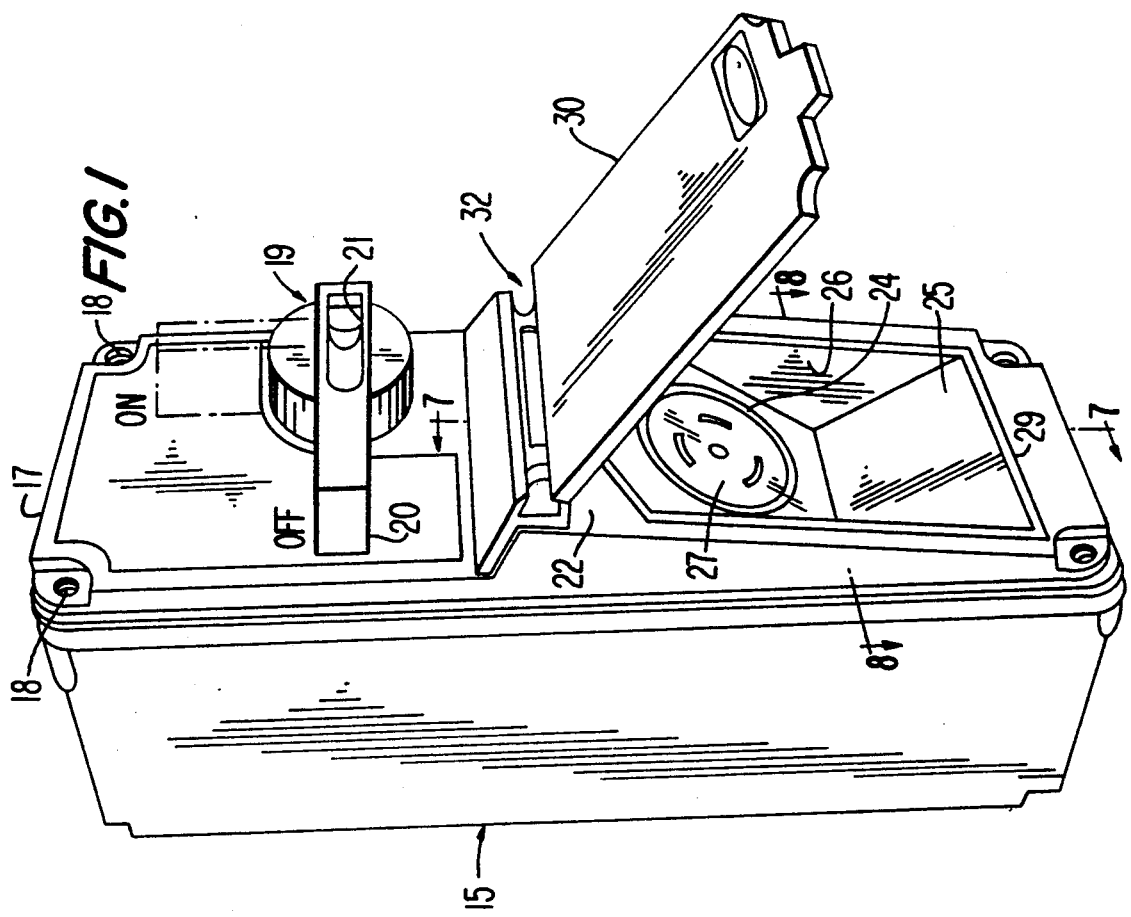

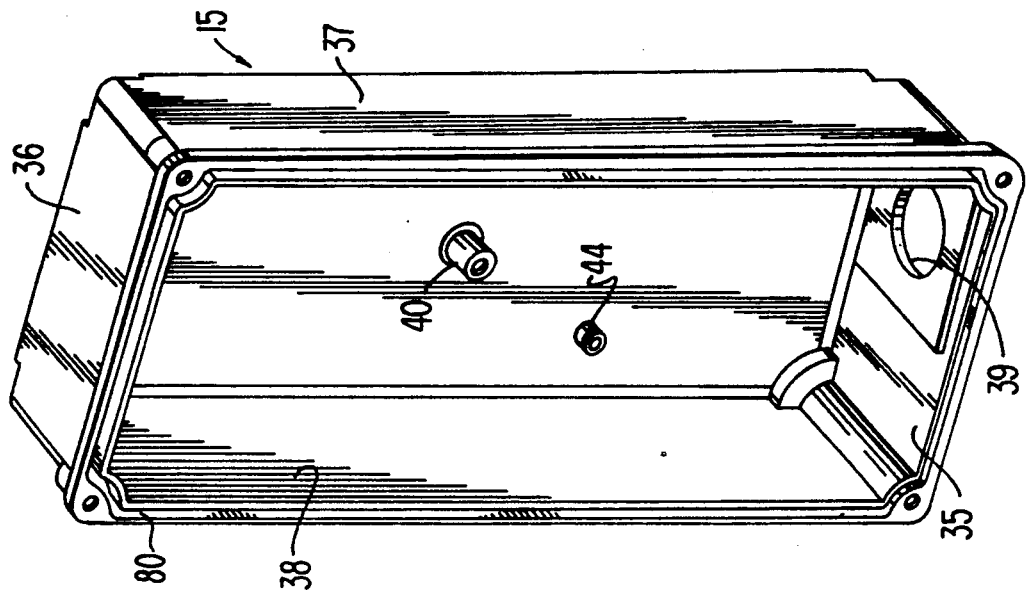
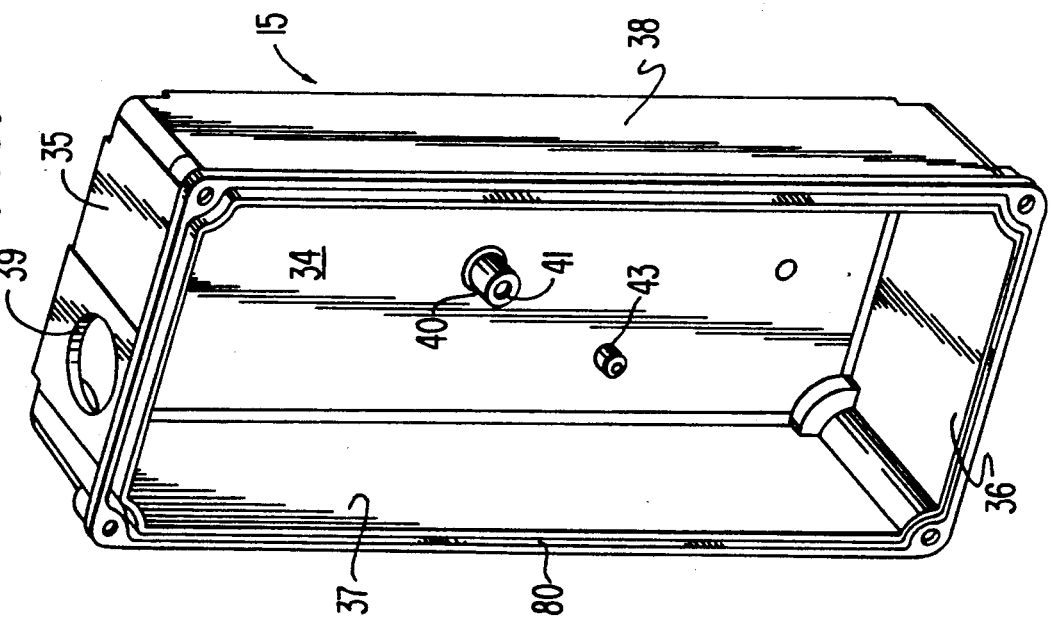

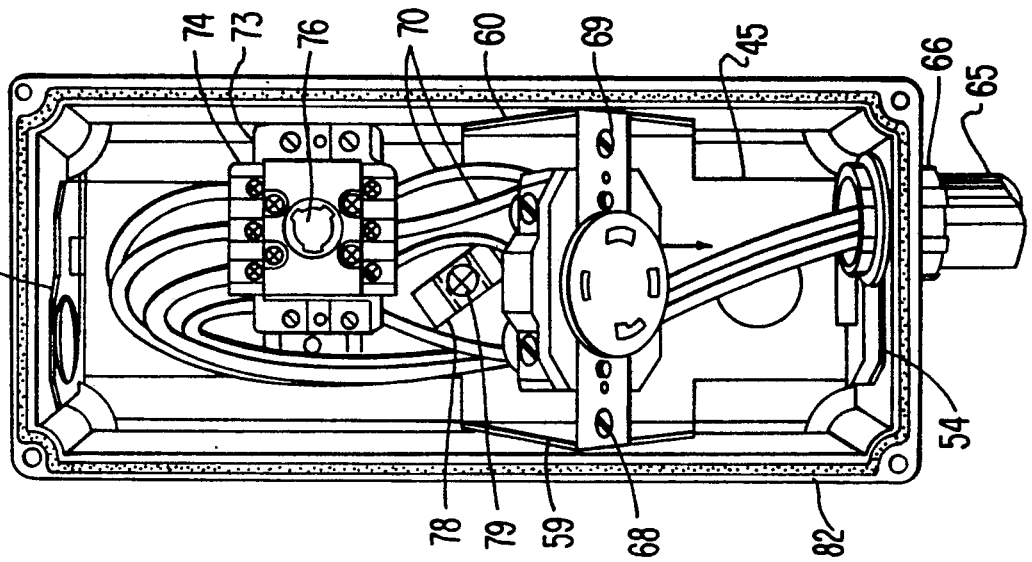
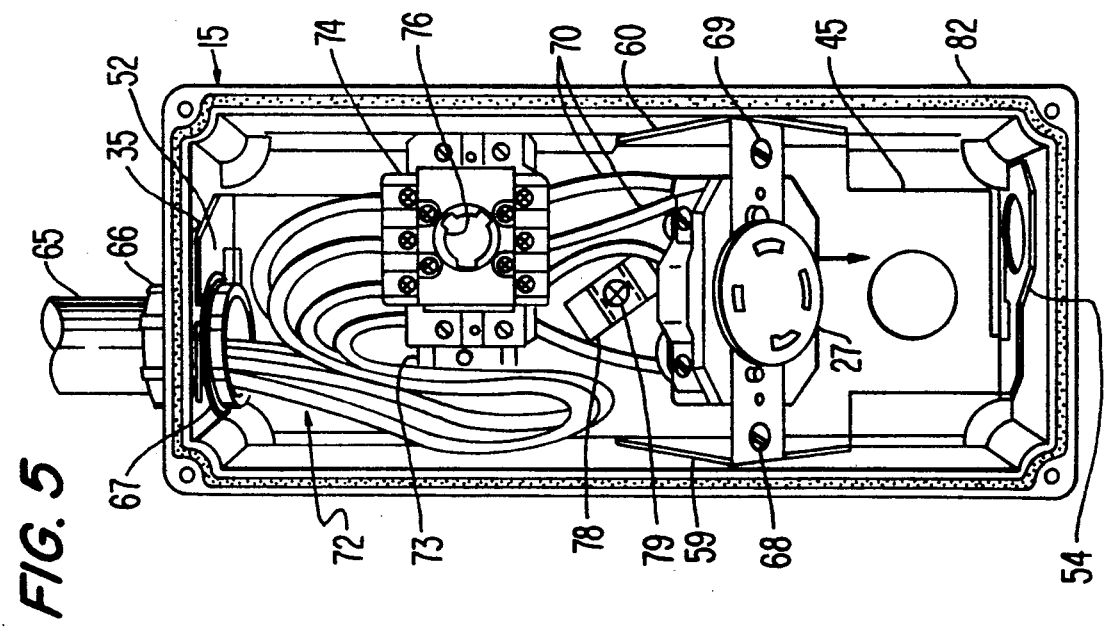

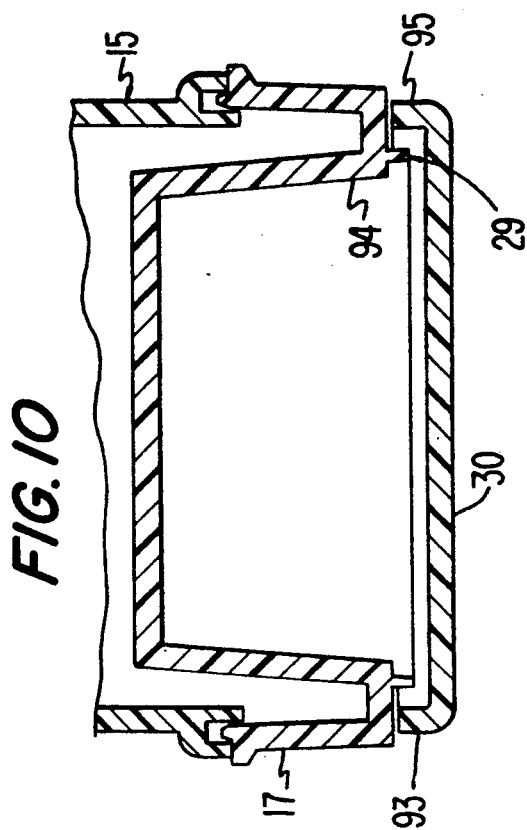
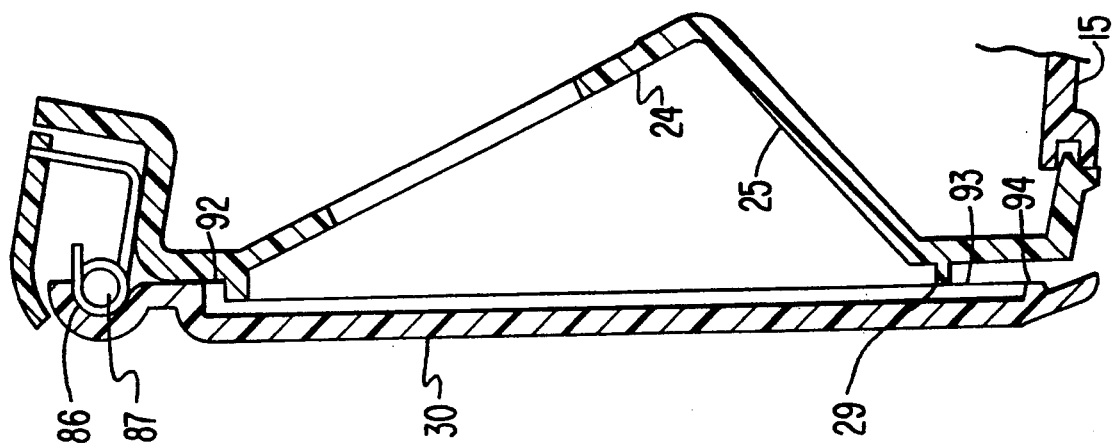

HOUSING FOR SWITCHED ELECTRICAL RECEPTACLE OR THE LIKE

FIELD OF THE INVENTION

This invention relates to an improved housing for mounting and protecting electrical apparatus such as a switched electrical receptacle and for protecting the apparatus from rain, spray or the like.

BACKGROUND OF THE INVENTION

Most housings for electrical equipment are provided with some means to permit penetration of the housing walls for the purpose of allowing entry of electrical conductors so that the conductors can be connected to each other or to an electrical device within the housing. Because housings may be mounted in various orientations and are sometimes connected to conduit or cable approaching the housings from any of several possible directions, the housings are commonly provided with multiple access ports, usually in the form of knockouts, so that the housing can be mounted in the most convenient manner depending on the circumstances which the installer faces at the installation site.

When the housing is made to contain an electrical device which has a necessary predetermined orientation, the problem is compounded because the device and the housing must both be taken into consideration. An example of a device which has a specific installed orientation is a switchable outlet unit of the type having an outlet with a switch above the outlet. The switch cannot be below the outlet because, if it were, a cable connected to a plug inserted in the outlet could inadvertently operated the switch when the cable is moved.

Especially in the case of weather-resistant housings intended to resist water entry from rain or spray, a desirable objective is the to minimize of the number and type of penetrations of the housing walls. Water can enter a housing in a variety of ways and any penetration which is not essential for electrical purposes should be avoided. However, when the housing is to be used with an oriented apparatus, such as the switchable outlet discussed above, the housing must be capable of mounting in at least two orientations to accommodate different directions of approach of the conduit to which it will be wired. The device itself, however, has only one acceptable orientation.

A further problem with electrical equipment housings arises when the box for the equipment is non-metallic. Some provision need be made for connecting the conduit, which is usually metal, to the ground locations or terminals of the devices in the box. This ground bonding is easy and somewhat automatic with metal boxes but with non-metal boxes, special steps must be taken.

SUMMARY OF THE INVENTION

Accordingly, an object of the invention is to provide a housing for electrical apparatus which is mountable in more than one orientation but has provision for holding electrical apparatus in each orientation and has a minimum number, preferably only one, connection opening penetrating the housing walls.

A further object is to provide such a housing which is non-metallic and which has an electrically conductive frame to facilitate alternative orientations and which provides for grounding of incoming conduit to ground terminals or locations on electrical devices within the housing.

Another object is to provide such a housing which resists entry of rain or spray and which has a connection opening arranged to minimize the effect of water entry by directing it away from the electrical devices and to facilitate handling and connection of wires within the housing.

In this context, the term "connection opening" refers to an opening in a wall positioned and dimensioned for the passage of electrical wires and suited for attachment of electrical conduit or cables, particularly conduit.

Briefly described, the invention comprises a housing for containing electrical apparatus and for accommodating connection of the apparatus to electrical conductors passing from outside to inside the housing including an enclosure made of an electrically non-conductive material and having one wall having a connection opening therethrough dimensioned to accommodate cable or conduit means containing electrical conductors. The enclosure has a plurality of substantially un-perforated walls including a back wall, the edges of the walls defining an open side opposite the back wall. A frame dimensioned to be received in the enclosure and made of an electrically conductive material has a central portion and substantially identical top and bottom end members, each end member having an opening therethrough dimensioned to be attached to the cable or conduit means. Means is provided for mounting the enclosure on a support surface with the back wall adjacent the surface and with the wall having said connection opening being selectively oriented either at the top or at the bottom of the enclosure. The frame is fixedly mounted in the enclosure with one of the top and bottom end members adjacent to and aligned with the connection opening. Thus, the enclosure is mountable in different positions for different cable connections with the frame in a single orientation and without making additional openings through the enclosure walls.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein:

FIG. 1 is a perspective view of a housing in accordance with the invention;

FIGS. 2 and 3 are perspective views of an enclosure portion of the housing of FIG. 1 showing two orientations of the housing and the connection opening therein;

FIG. 4 is a perspective view of a mounting frame usable within the enclosure of FIGS. 2 and 3;

FIGS. 5 and 6 are interior views of the enclosure of FIGS. 2 and 3 with typical apparatus and wiring therein in the two orientations;

FIG. 9 is a transverse sectional view along line 7—7 of FIG. 1;

FIG. 10 is a transverse sectional view along line 8—8 of FIG. 1;

DESCRIPTION OF THE PREFERRED EMBODIMENT

Figure 7:
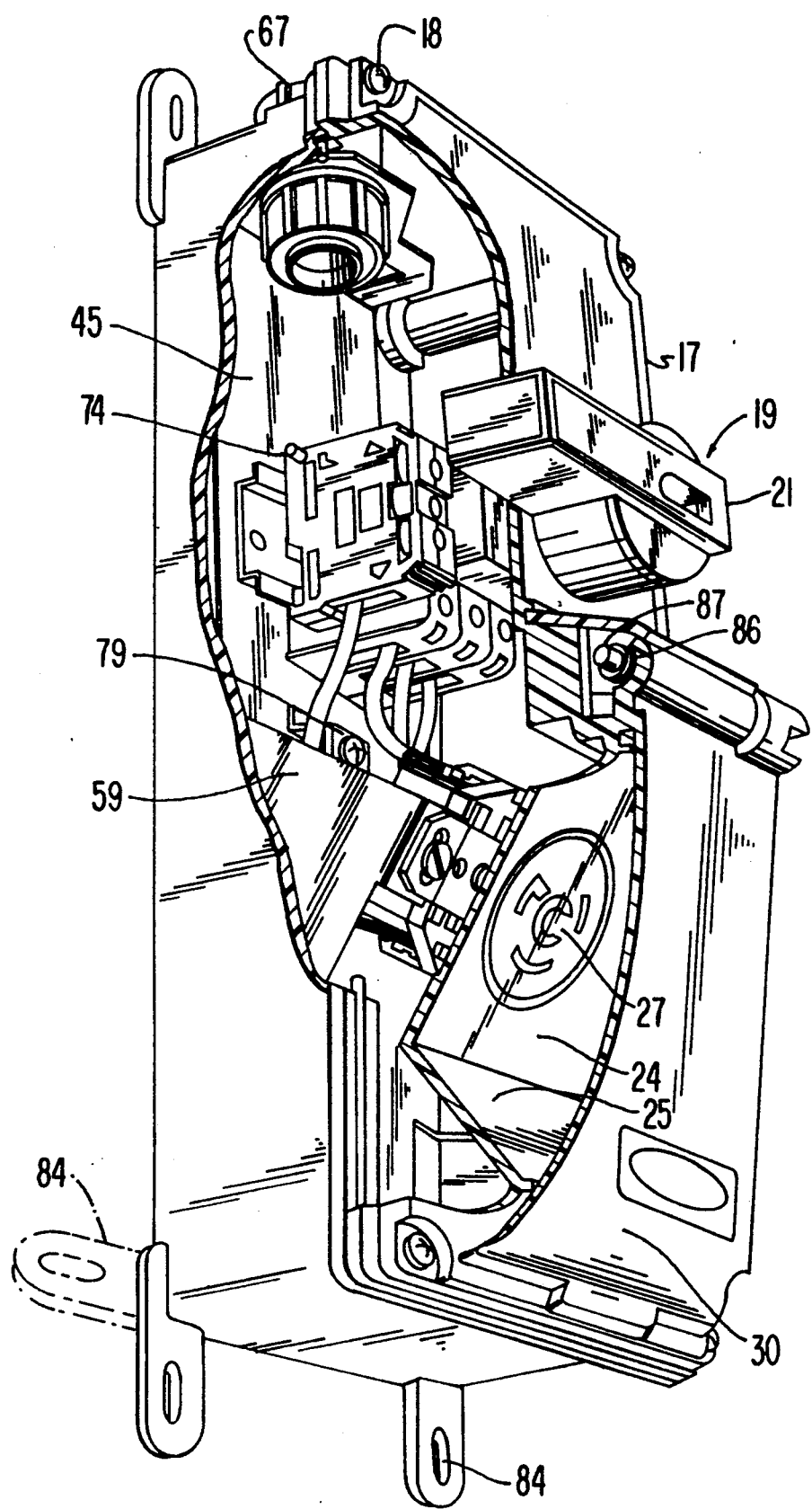
FIG. 7 is a partially cut-away perspective view of an assembled housing.

FIG. 1 shows the overall arrangement of a switched receptacle device incorporating a housing in accordance with the present invention. As shown therein, the apparatus includes an enclosure indicated generally at 15 which is made of an electrically non-conductive material and which, in the particular embodiment shown, is in a rectangular shape having top and bottom walls, side walls, and a back wall, all of which are substantially continuous and un-perforated except for the openings which will be described herein. The front edges of the side walls of the enclosure define an open front which is closed by a front panel 17 attached to the enclosure by screws 18. The upper portion of panel 17 carries a switch operator indicated generally at 19 with a handle 20 movable between "off" and "on" positions which are marked on the front of the panel. Switch operator 19 is provided with an opening 21 to receive the shackle of a conventional padlock so that the switch can be locked in the "off" position.

The lower portion of panel 17 protrudes outwardly and is formed with a downwardly and inwardly sloping wall 22, the central portion of which is recessed to provide two intersecting sloping walls 24 and 25 and side walls 26. Wall 24 has a circular opening through which the front face of an electrical receptacle 27 is accessible. Wall 22 has a short wall 29 formed thereon, wall 29 constituting a rim around the recessed region defined by walls 24–26. Cover 17 also carries a lid 30 which is connected to the cover by a hinge structure indicated generally at 32 so that the lid is pivotable between open and closed positions. Further details of the hinge structure will be described with reference to FIGS. 8, 11 and 12. Preferably, the hinge structure is spring-loaded so that lid 30 is urged toward its closed position in which the lid covers the recessed portion of wall 22 and substantially surrounds short wall 29.

In this particular structure, electric conductors feeding the receptacle, the face 27 of which is visible in FIG. 1, are switched by a switch within the enclosure operated by handle 20. The face 27 of the receptacle is positioned at an angle to the vertical such that when a mating plug is connected to the receptacle, the plug extends outwardly and downwardly away from the receptacle, minimizing bending of electrical cable connected to the plug. While a plug is connected to the receptacle, lid 30 is held open by the plug itself but forms a rain- and spray-deflecting cover for the plug while it is in that position to protect the plug.

FIGS. 2 and 3 show enclosure 15 apart from the remainder of the structure so that various features thereof can be discussed. As seen in FIG. 2, the enclosure has a back wall 34, end walls 35 and 36, which are at the top and bottom, respectively, in FIG. 2, and side walls 37 and 38. Top end wall 35 is provided with a circular opening 39 which is laterally offset from the longitudinal centerline of the enclosure and which is dimensioned to accommodate a conduit for carrying electrical conductors so that the conductors can pass from the conduit into the interior of the enclosure. Back wall 34 is provided with a central boss 40 having an internally threaded opening 41 therein and is also provided with positioning bosses 43 and 44, only boss 43 being visible in FIG. 2.

FIG. 3 shows the same enclosure inverted so that wall 35 is now the bottom wall and wall 36 is at the top. Positioning boss 44 can be seen in FIG. 3.

Except for the position of opening 39, the enclosure is essentially symmetrical. It is arranged to receive a mounting frame which provides flexibility in the mounting of this apparatus as will be described with reference to FIGS. 4–6.

The mounting frame 45, as seen in FIG. 4, includes a substantially planar central portion having a central opening 47 and positioning openings 48 and 49 and also a conduit opening 50. This frame has a specific top and bottom orientation in the position shown in FIG. 4 and includes a top mounting bracket 52 at the upper end and a bottom mounting bracket 54 at the lower end. The orientation in which frame 45 is to be mounted can be shown, for example, by an arrow and the word "down" printed on the frame itself. Brackets 52 and 54 are identical to each other, these brackets having circular openings 55 and 57, respectively, positioned laterally offset from a longitudinal central axis of the central portion of the mounting frame.

Support arms 59 and 60 extend forwardly from opposite sides of the central portion of frame 45 and terminate in mounting brackets 61 and 62. Brackets 61 and 62 lie in a plane which forms an angle with respect to the central portion of frame 45 which is suitable for mounting an electrical device and which is the same angle relative to the vertical as that of wall 24 of cover 17. Brackets 61 and 62 are provided with openings to receive mounting screw so that an electrical device, such as receptacle 27, can be attached thereto.

Referring now to FIGS. 5 and 6, it will be seen that FIG. 5 shows enclosure 15 in the position shown in FIG. 2 with frame 45 mounted therein and with a conduit 65 attached to openings 39 and 55 by conventional threaded fastening nuts 66 and 67 on the outside of wall 35 and the inside of bracket 52, respectively. Fastening screws 68 and 69 support a receptacle 27 between arms 59 and 60, the receptacle being electrically and mechanically connected to a plurality of wires 70. Conductors indicated generally at 72 enter the enclosure from conduit 65 and are connected to appropriate terminals of receptacle 27 or a switch 74 which is mounted on a conventional DIN rail 73 attached to the central portion of frame 45. Wires 70 are connected to the switch or are continuations of wires 72, depending upon the electrical connection required. Switch 74, in the embodiment shown, has a female clutch member 76 formed at the front thereof to engage a mating male operator attached to handle 20 so that when the handle is moved, the switch is operated between the "off" and "on" positions.

FIG. 6 shows an arrangement with the same components shown in FIG. 5, the difference being that enclosure 15 is in the position shown in FIG. 3 with the conduit entering the housing from the bottom rather than the top. It is particularly important to note that, although enclosure 15 has been inverted, frame 45 remains in the same orientation which it occupied in the arrangement of FIG. 5. In FIG. 5, conduit 65 extended through opening 39 and also through opening 55 in bracket 52 on frame 45. However, in the arrangement of FIG. 6, the conduit passes through opening 39 along with opening 57 in bracket 54 on the frame. Switch 74 and receptacle 27 are mounted on the frame, not the enclosure, and therefore have the same orientation in FIGS. 5 and 6.

It is also important to note that, regardless of which orientation is used, cover 17 is positioned as shown in FIG. 1, the face of the receptacle is always in a downwardly and outwardly facing position and a plug used in conjunction with the receptacle occupies the same downwardly extending position, sheltered by lid 30.

In either position, frame 45 is held in enclosure 15 by inserting boss 40 through opening 47, and positioning bosses 43 and 44 through openings 49 and 48 (or 48 and 49). A U-shaped mounting clip 78 is placed on the boss with outwardly extending legs of the clip against the frame, the clip being held in the boss by a threaded fastener 79 which is threaded into opening 41.

It will also be noted that the forward edge of enclosure 15 which surrounds and defines the open side thereof, is provided with a channel 80 in which a gasket 82 is positioned, as shown in FIGS. 5 and 6, to reduce the likelihood of entry of moisture.

As mentioned above, opening 39 is laterally offset from the vertical center line of enclosure 15. This arrangement has some distinct advantages. First, wires entering the enclosure, regardless of which orientation is used, enter along a line which is to one side of the electrical devices supported therein, permitting the assembly and wiring to be somewhat easier than with a central opening. Wiring through a conduit into an enclosure of this type is quite often done with some form of "snake" which is passed through the conduit and then used to pull electrical cable into the box. With the connection opening and the conduit offset from the centerline as shown, working with the snake and cable is considerably easier than with a centrally located hole.

Additionally, any moisture entering the enclosure through the conduit opening will tend not to drip directly upon the electrical devices supported therein, particularly switch 74. Rather, moisture will tend to follow the wires 72 down to the bottom of the loop shown in FIGS. 5 and 6 and fall to the bottom of the enclosure rather directly on the hot electrical components. The offset of opening 39 is, of course, the same as the offset of openings 55 and 57 in the brackets on frame 45 so that they are aligned in either orientation to mate with the conduit.

Frame 45 is made of an electrically conductive material, such as galvanized steel, so that it constitutes a continuous ground connection between incoming conduit and ground portions of the receptacle and switch or other electrical devices housed therein. This bonding of components overcomes the grounding problems common to non-metallic enclosures without the need for special fittings or wiring.

It is possible with the structure shown to accommodate wiring to conduits approaching from either the top or the bottom. There are some circumstances in which wiring through the back wall of the box is necessary. Because this is a relatively rare requirement, no opening is formed in enclosure 15 for this purpose. However, opening 50 is formed in frame 45 at an appropriate location for such an opening and the back wall of the enclosure can be drilled or punched with an opening of the proper size, aligned with opening 50, if necessary at the installation site. In that case, enclosure 15 should be oriented with opening 39 at the bottom of the enclosure and the opening should be closed by a standard UL listed or CSA certified closure plug. As with any electrical device, installation should only be undertaken by a qualified electrician.

FIG. 7 shows a cutaway view of the structure thus far described, showing the relative positions of the various internal components with lid 30 in the closed position. The corners of the enclosure are provided with mounting feet 84 which are rotatable to either vertical or horizontal positions for most convenient mounting. FIG. 7 also shows the coil spring 86 which surrounds hinge pin 87 and urges the lid toward its closed position.

Figure 8:
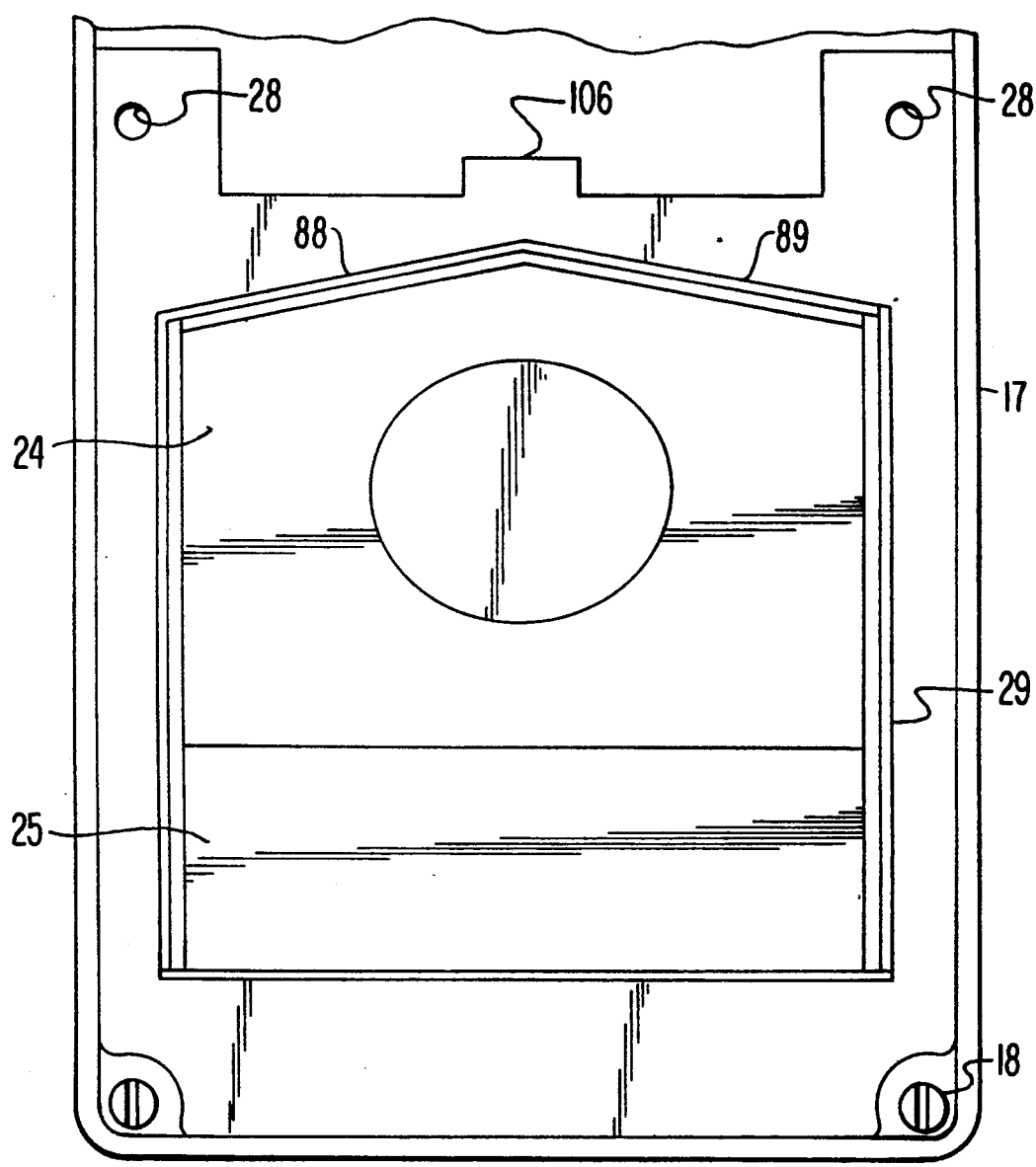
FIG. 8 is a partial front elevation of a portion of the cover of the housing of FIGS. 1-7.

FIG. 8 shows more clearly the position and shape of wall 29 which surrounds the recess in the front of cover 17. In FIG. 8, the entire lid and hinge structure, normally attached using holes 28, has been omitted to permit an unobstructed view of the recess and wall 29. Of particular importance is the fact that the upper portion of the short wall has two roof-like portions 88 and 89 which come to a point at the center and slope downwardly and outwardly toward the side edges of the cover to drain rain water or the like away from the recess.

Cooperating with this short wall structure, lid 30 is formed with edges 92, 93, 94 and 95, shown in the sectional views of FIGS. 9 and 10, which turn inwardly toward the front surface of cover 17 (with the lid closed). These inturned edges overlap wall 29, i.e., the edges lie closer to the front surface of cover 17 than the distal edges of wall 29, and lie laterally outwardly of wall 29 to form a further rain barrier. The combination of short wall 29, the inturned edges of lid 30 which surround and overlap that wall and the peaked shape of the top of the wall form an effective barrier to water. It will be noted that the edges 92-95 and wall 29 do not touch, thereby avoiding any capillary action which might draw water to the inside of the lid.

Figure 11:
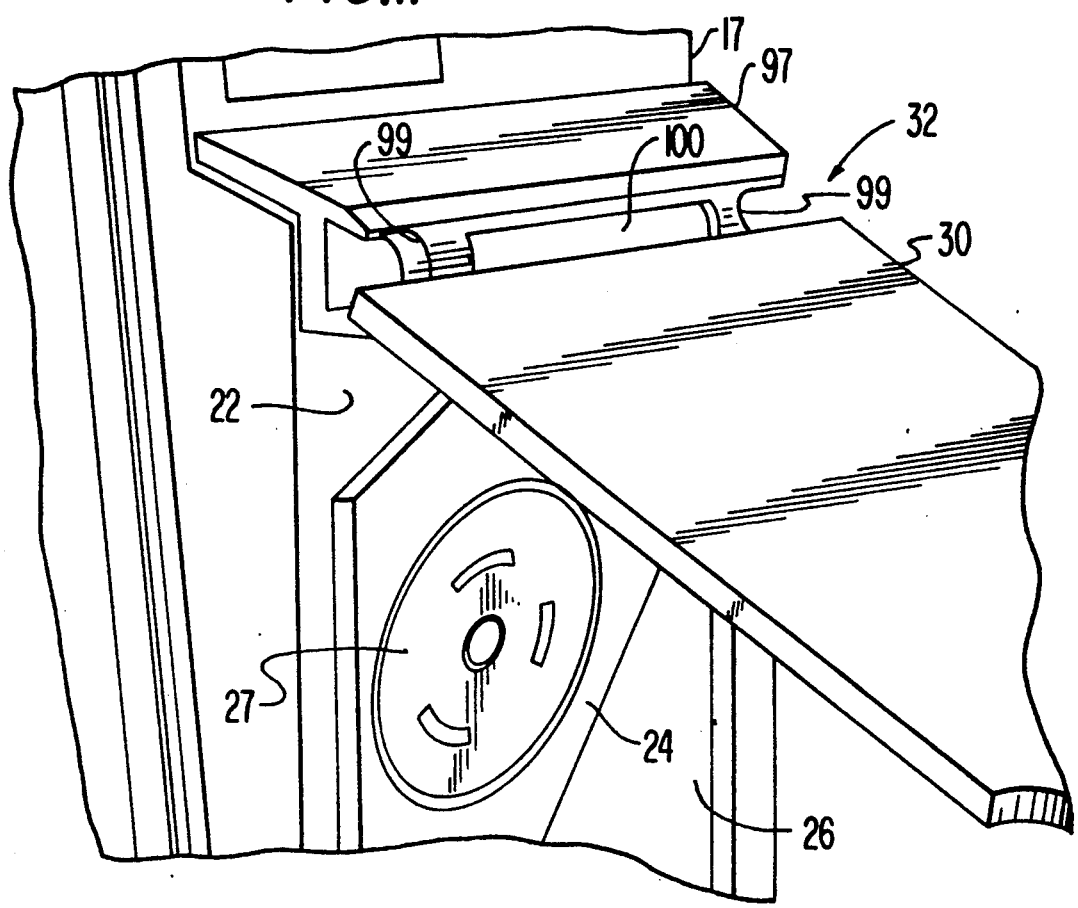
FIG. 11 is an enlarged partial perspective view of the cover and lid of the housing of FIG. 1.

The lid structure is arranged so that its hinge is part of a sub-assembly with the lid and so that this sub-assembly attaches easily to cover 17 with two screws. This facilitates replacement in the field, if necessary. FIG. 11 is a perspective view of the lid 30 and hinge sub-assembly attached to the cover. A generally L-shaped mounting bracket 97 mates with the upper part of the protruding portion of cover 17 and is provided with holes 96 to receive screws 98 which thread into holes 28 in the cover (FIG. 8). Bracket 97 is formed with end supports 99 which receive the ends of hinge pin 87.

Figure 12:
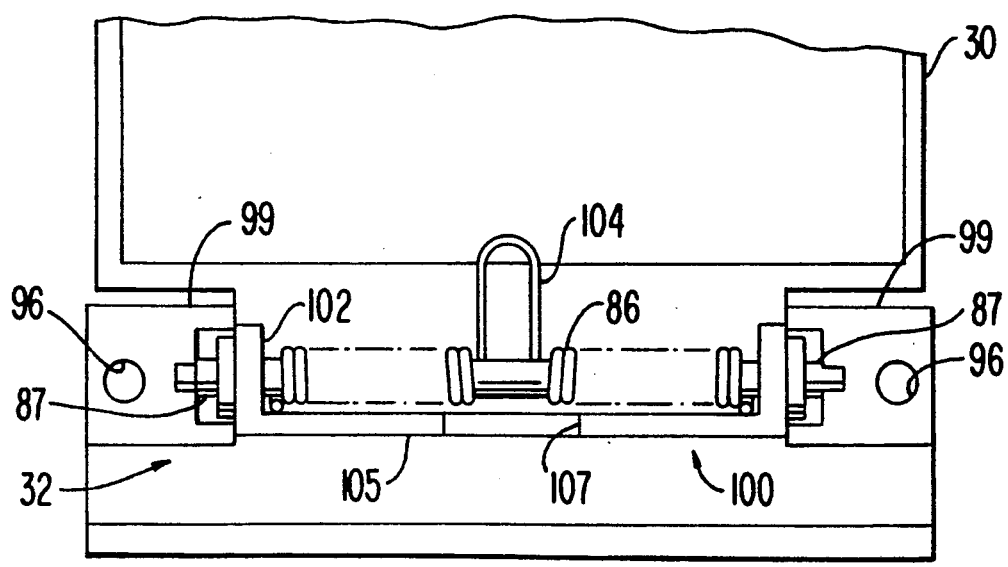
FIG. 12 is a partial plan view of the inside of the lid showing the spring attachment thereof to the cover.

As best seen in FIG. 12, a central portion 100 of the hinge is integrally formed on lid 30 and extends between end supports 99. The ends of hinge pin 87 extend into recesses in end supports 99 and the hinge pin passes through circular openings in side trunnions 102 of portion 100. The central part of the hinge pin is surrounded by double-coiled spring 86 which has a loop 104 in the center. The spring is wound so that its outer ends press against the inner surface of an end wall 105 of central portion 100 and so that loop 104 is urged toward the inside of lid 30. Thus, when the lid-hinge sub-assembly is apart from the cover, the loop is against the lid as shown in FIG. 12.

When the sub-assembly is mounted on the cover, loop 104 is pressed down into a recess 107 and placed behind an abutment 106 (FIG. 8) as screws 98 are placed through holes 96 and threaded into holes 28, attaching the subassembly to the cover. The spring then acts between abutment 106 and wall 105 to urge the lid toward its closed position.

While one advantageous embodiment has been chosen to illustrate the invention, it will be understood by those skilled in the art that various changes and modifications can be made therein without departing from the scope of the invention as defined in the appended claims.

What is claimed is:

1. A housing for containing electrical apparatus and for accommodating connection of said apparatus to electrical conductors passing from outside to inside the housing comprising the combination of
   an enclosure made of an electrically non-conductive material, said enclosure having
      one wall having a connection opening therethrough dimensioned to be attached to means for containing electrical conductors,
      a plurality of walls, including substantially un-perforated side and back walls, and
      means including edges of said walls defining an open side opposite said back wall;
   a frame dimensioned to be received in said enclosure, said frame being made of an electrically conductive material and having
      a central portion, and
      substantially identical top and bottom end members, each said end member having an opening therethrough dimensioned to be attached to said means for containing electrical conductors;
   means for mounting said enclosure on a support surface with said back wall adjacent said surface and with said wall having said connection opening through said wall thereof being selectively oriented either at the top or at the bottom of said enclosure; and
   means for fixedly mounting said frame in said enclosure with one of said top and bottom end members adjacent to and aligned with said connection opening, whereby said enclosure is mountable in different positions for different cable connections with said frame in a single orientation and without making additional openings through said enclosure walls.

2. A housing according to claim 1 and further comprising means on said frame for supporting electrical apparatus.

3. A housing according to claim 1 and further comprising cover means for closing said open side.

4. A housing according to claim 3 wherein said cover means includes means for supporting electrical apparatus thereon.

5. A housing according to claim 4 and further comprising a lid hingedly supported on said cover means for covering exposed portions of said cover means and apparatus supported thereon.

6. A housing according to claim 4 wherein said cover means includes means defining a recess and means for supporting an electrical receptacle having a front face exposed in said recess, said housing further comprising a lid and hinge sub-assembly removably attached to said cover means, said lid being movable between open and closed positions in which said recess is open and covered, respectively.

7. A housing according to claim 6 wherein said sub-assembly comprises a mounting bracket having a first hinge portion, a second hinge portion formed on said lid, a hinge pin extending through said first and second hinge portions and a spring around said hinge pin for urging said lid toward said closed position.

8. A housing according to claim 1 wherein said means for containing electrical conductors comprises a metal conduit, said electrically conductive frame forming a ground connection between said conduit and said electrical apparatus in said housing.

9. A housing according to claim 1 and further comprising a cover dimensioned to close said open side and having a top edge and a bottom edge, and means for attaching said cover to said enclosure with said top edge up when said enclosure is mounted on said support surface with said connection opening either up or down.

10. A housing according to claim 9 wherein said cover includes means defining a recess in said cover and means for supporting an electrical device in said recess, said housing further comprising a door hingedly attached to said cover and movable to a closed position for selectively covering said recess and said electrical device.

11. A housing according to claim 10 wherein said cover further includes means defining a protruding short wall surrounding said recess, said short wall forming a peak at the edge thereof closest to said top edge of said cover and pointing toward said top edge to deflect water.

12. A housing according to claim 11 wherein, in said closed position, said door extends across said recess and substantially lies in a plane containing distal edges of said short wall, said door including edges extending toward said cover and remaining spaced from said cover and said short wall in said closed position and substantially surrounding said short wall to inhibit entry of water into said recess.

13. A housing according to claim wherein said frame includes first and second arms extending from said central portion toward said open side of said enclosure for supporting an electrical device.

14. A housing according to claim 1 wherein said enclosure has a centerline which extends vertically when said enclosure is mounted in either of said positions, and wherein said connection opening is laterally displaced from said centerline.

15. A housing according to claim 14 wherein said electrical apparatus is mounted substantially centered on said centerline whereby water entering said enclosure and following wires entering said connection opening is led away from said electrical apparatus.

16. A housing for containing electrical apparatus and for accommodating connection of said apparatus to electrical conductors passing from outside to inside the housing comprising the combination of
   an enclosure made of an electrically non-conductive material, said enclosure having
      one wall having a connection opening therethrough dimensioned to be attached to means for containing electrical conductors,
      a plurality of additional walls including a back wall, and
      means including edges of said walls defining an open side
   a frame dimensioned to be received in said enclosure, said frame being made of an electrically conductive material and having
      a central portion, and
      substantially identical top and bottom end members, each said end member having an opening therethrough dimensioned to be attached to said means for containing electrical conductors;
   means for mounting said enclosure on a support surface with said back wall adjacent said surface and with said wall having said connection opening through said wall thereof being selectively oriented either at the top or at the bottom of said enclosure; and means for fixedly mounting said frame in said enclosure with one of said top and bottom end members adjacent to and aligned with said connection opening, whereby said enclosure is mountable in different positions for different cable connections with said frame in a single orientation and without making additional openings through said top or bottom of said enclosure.

* * * * *